May 30, 1939.  F. F. WELLER  2,160,770
AUTOMOBILE JACK
Filed Nov. 1, 1938  2 Sheets-Sheet 1
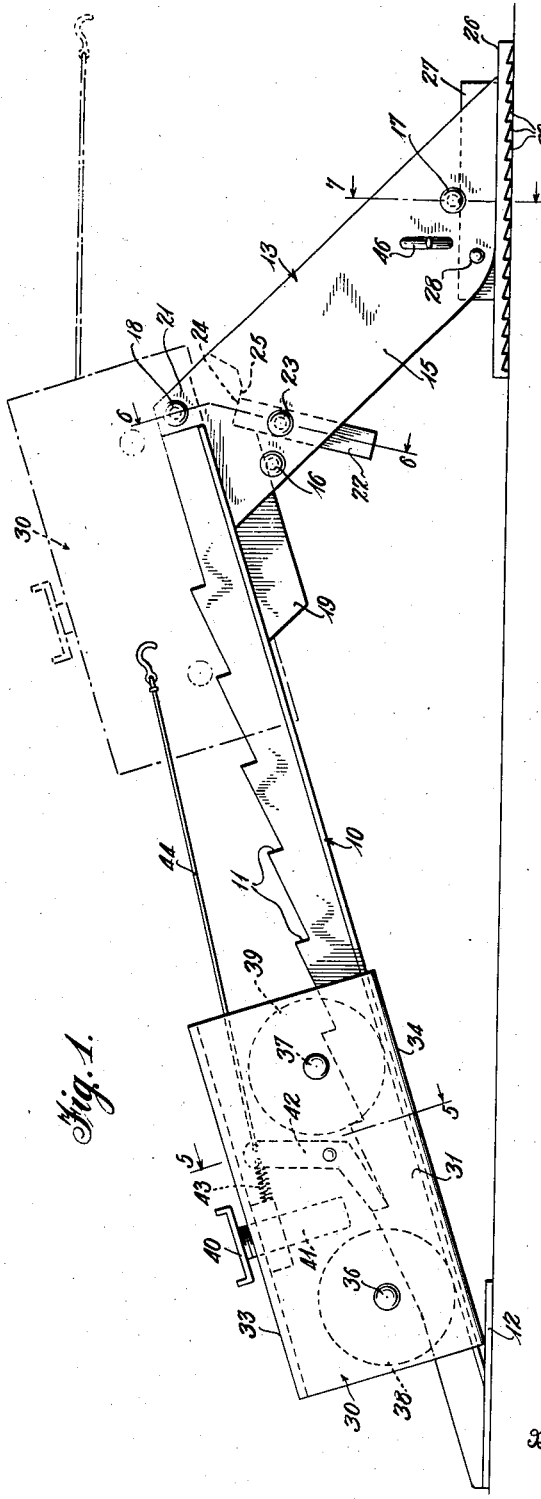
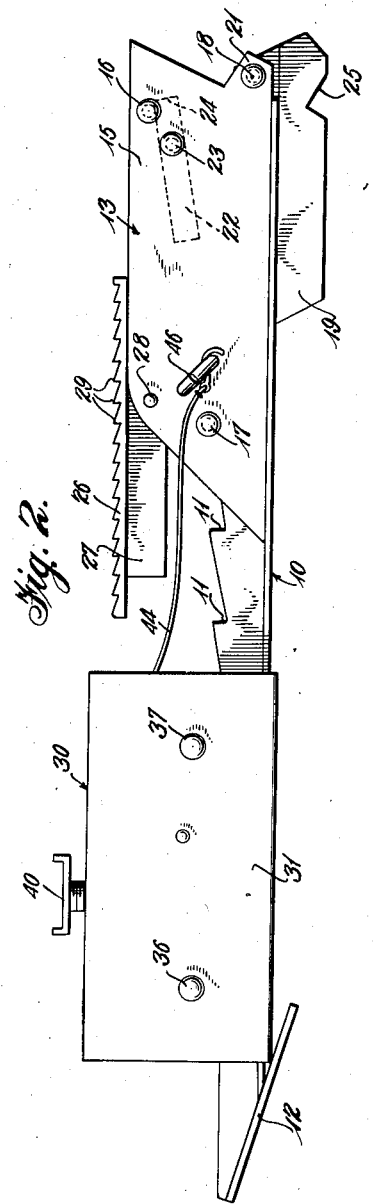
Inventor
Frank F. Weller
By Brown & Phelps
Attorney May 30, 1939.   F. F. WELLER   2,160,770
AUTOMOBILE JACK
Filed Nov. 1, 1938   2 Sheets-Sheet 2
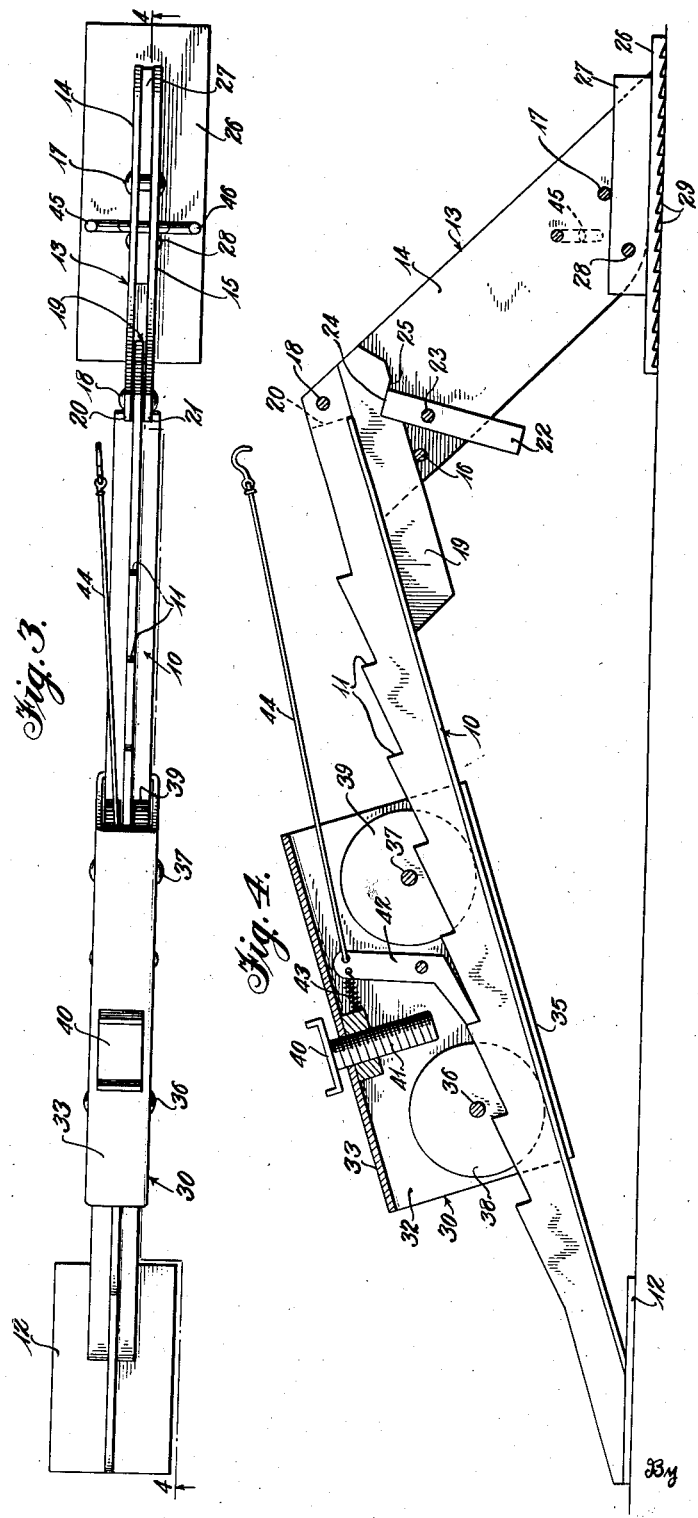
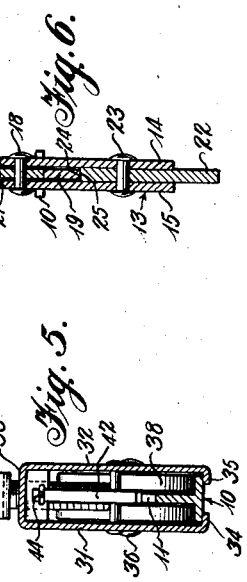
Inventor
Frank F. Weller
By Browne & Phelps
Attorneys Patented May 30, 1939

2,160,770

UNITED STATES PATENT OFFICE 2,160,770

AUTOMOBILE JACK

Frank F. Weller, Jennings, La., assignor of one-half to James O. Modisette, Jennings, La.

Application November 1, 1938, Serial No. 238,276

8 Claims. (Cl. 254—88)

The invention relates to vehicle jacks and has as an object the provision of an inclined plane type of jack for use particularly with automobiles.

It is an object of the invention to provide a jack of simple character that shall be convenient in use and which will fold to a compact form for carriage.

It is a further object of the invention to provide a vehicle having releasable means to prevent retrograde movement of the vehicle when a wheel has been lifted.

It is a further object of the invention to provide a jack having an adjustable vehicle contacting portion of simple character.

Further objects of the invention will appear from the following description when read in connection with the accompanying drawings showing an illustrative embodiment of the invention, and wherein:—

Figures 1 and 2 are side elevations respectively in position for use and in folded position;

Fig. 3 is a plan view;

Fig. 4 is a side elevation with the car shown in section; and

Figures 5, 6, and 7 are transverse sections on the cross section lines of Figure 1.

As shown the device comprises an inclined plane member 10 shown as formed of an inverted T shape having ratchet teeth 11 formed upon the edge of the web and having a ground-engaging plate 12 attached to the lower end thereof.

To hold the inclined plane member in position for use there is shown a support member 13 illustrated as formed of spaced members 14, 15 connected by rivets 16, 17, and pivotally connected to an exposed end of the web of member 10 as at 18, the said portion of the web being exposed by cutting away the flanges for the necessary distance.

To assist in holding the members 10 and 13 in the position of use, there is shown a web member 19 attached to the center of the flange portion of the member 10 as by welding, which member 19 stands between the spaced apart portions 14, 15 when in the position for use shown in Figures 1 and 4.

The rivet 16 is so located as to prevent excess movement of the member 13 in its unfolding movement. The members 14, 15 are shown as cut away to provide the ears 20, 21 through which the pivoting rivet 18 passes. To prevent the flattening of the jack under weight of the vehicle, there is shown a latch member 22 pivoted at 23 between the members 14, 15, the upper end 24 of which latch member seats in a notch 25 in rib 19. When it is desired to fold the jack, the projecting end of the latch member 22 may be manually pulled upon thus swinging of the latch end 24 out of the notch.

To provide a bearing upon the ground or pavement there is shown a shoe 26 comprising a plate having a rib 27 carried by its central portion, which rib is pivoted at 28 between the members 14, 15, the lower end of said members being cut at the angle shown in Figures 1 and 2 to cause the member 26 to lie thereagainst. Additional bearing of the members 14, 15 upon the member 26 is provided by the placing of the rivet 17 to abut the edge of rib 27.

The lower surface of member 26 is shown as serrated at 29 to prevent slippage. When the device is folded as shown in Figure 2, the member 26 will occupy the position shown therein.

To carry the weight of a vehicle, a car member 30 is shown in the form of a shell having side walls 31, 32 and an upper wall 33, the side walls being spaced to receive the flanges of the inclined plane member 10, the lower margins of the plates 31, 32 being turned about said flanges as at 34, 35, Figure 5.

Mounted upon axles 36, 37 there are shown two pairs of wheels 38, 39 running upon the flanges of the inclined plane member 10. To contact the axle or other portion of the vehicle to be raised there is shown a channel member 40 fixed upon a screwthreaded shaft 41 engaging an internally screwthreaded boss 32, for adjustment of height to suit the portion of the vehicle to be contacted.

To prevent undesired retrograde movement of the car of the vehicle 30 when the vehicle has been lifted so much as desired, there is shown a pawl 42 engaging the ratchet teeth 11 and urged into such engagement by a spring 43 acting in tension. To at will manually release the pawl 42 there is shown a flexible member 44 secured to the lever end of the pawl 42 which may be pulled upon to cause release of the pawl.

In case one of the rear wheels of the vehicle must be lifted for service the device would be inoperative when said wheel leaves the ground through differential action of the vehicle. To prevent the spinning of the wheel under these conditions, a flexible member of any character may be engaged with the wheel as with a spoke thereof and the other end may be engaged in one of the hook members 45, 46 provided for the purpose.

The operation of the device will be obvious from the above description.

The device will be unfolded into position, Figure 1, slipped under the vehicle until the member 40 engages the axle of other desired portion of the vehicle to be lifted which will be adjusted for height before placing of the jack. The machine is then driven forwardly or backwardly under its own power as required, when the car 30 will ride up the inclined member lifting the wheel to be serviced.

When the device is to be stored either in the garage or in the vehicle, it may be folded to the position shown in Figure 2, making a compact and readily portable package.

Minor changes may be made in the physical embodiment of the invention within the scope of the appended claims without departing from the spirit thereof.

I claim:

1. An automobile jack comprising, in combination: an inclined plane member; a support member pivoted to the first named member adjacent its upper end for movement in excess of 180° thereabout; a releasable latch member coacting between said members to preserve their angular relation in use and by release thereof permitting folding of said members into mutual contact at the upper surface of said member; and an axle engaging member slidable on the first named member.

2. An automobile jack comprising, in combination: an inclined plane member formed as an inverted T having its flanges cut away adjacent its upper end; a support member formed with spaced portions adjacent its upper end, straddling and pivoted to the exposed web of said T and foldable about the end thereof into contact with its upper portion; a latch member pivoted to said support member and engaging a portion of the first named member to prevent said folding movement; and an axle engaging member slidable on said first named member.

3. The combination of claim 2 with a portion of the supporting member while in supporting position, engaging a portion of the inclined plane member to prevent excess movement about the pivot in unfolding movement.

4. An automobile jack comprising, in combination: an inclined plane member formed as an inverted T; means to support the higher end of said member; an axle engaging car slidable on the flanges of said plane member and straddling the web thereof; ratchet teeth formed on the upper edge of said web with upwardly facing holding shoulders; a pawl carried by said car, spring-pressed into engagement with said teeth; and means for manual release of said pawl.

5. An automobile jack comprising, in combination: an inclined plane member formed as an inverted T; means to support said member in an inclined position; a car slidable on said member comprising a shell having flanges underlapping the margins of the flanges of the member; front and rear pairs of wheels journaled in said shell and traveling on said flanges and means carried by the car to engage a portion of a vehicle to be serviced.

6. The combination of claim 5 in which the vehicle engaging portion has threaded engagement with the shell of the car for height adjustment.

7. The combination of claim 5 in which the upper edge of the web of the T member is formed with ratchet teeth and a pawl is carried by the car to prevent retrograde movement of the car.

8. The combination of claim 1 with a ground engaging plate pivoted upon the lower end of the support member, and foldable into substantial longitudinal alignment therewith.

FRANK F. WELLER.